March 31, 1942.  F. R. SHANLEY  2,278,219
AIRPLANE SAFETY DEVICE
Original Filed May 15, 1934
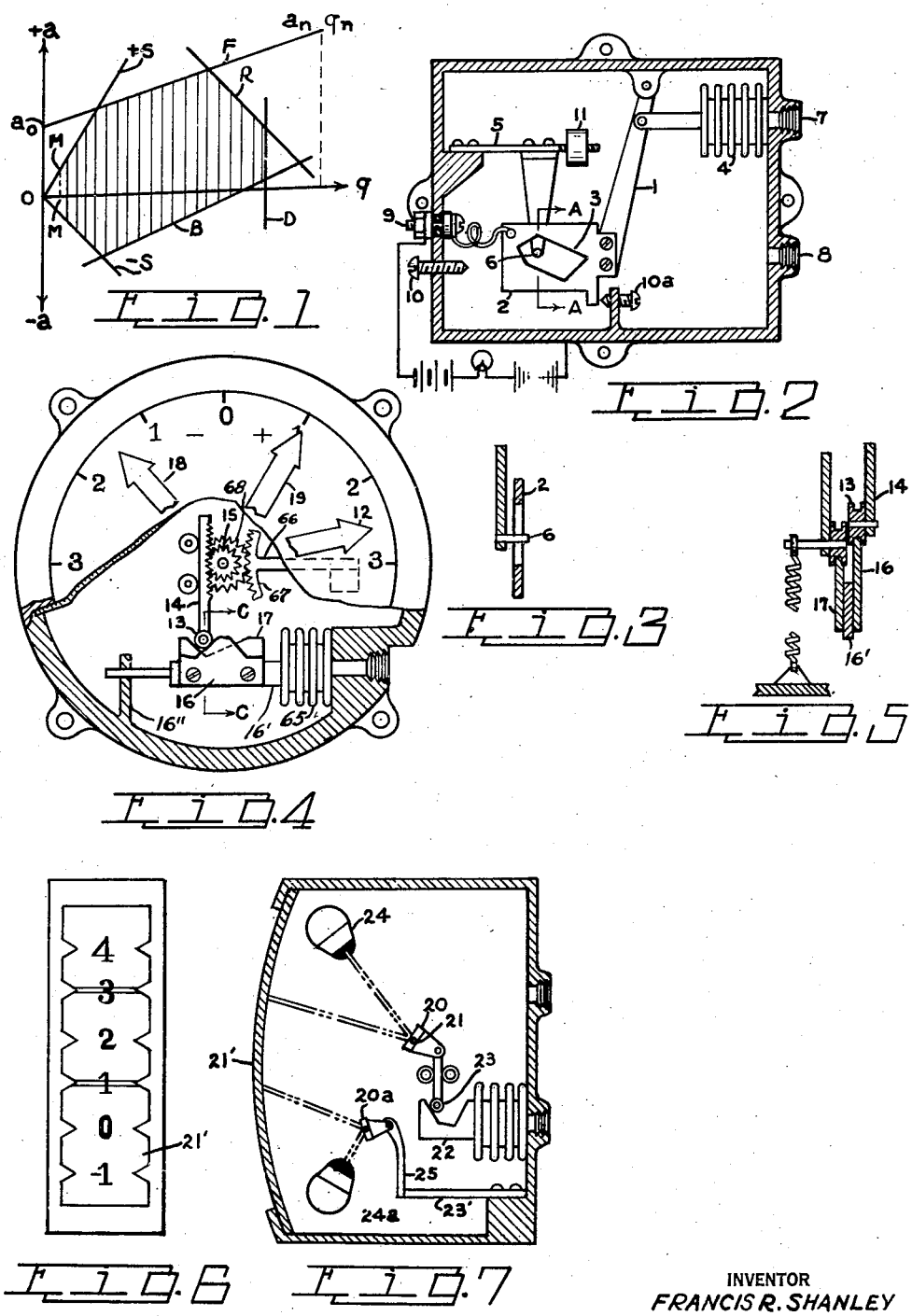
INVENTOR
*FRANCIS R. SHANLEY*
BY
ATTORNEY Patented Mar. 31, 1942

2,278,219

UNITED STATES PATENT OFFICE 2,278,219

AIRPLANE SAFETY DEVICE

Francis R. Shanley, Los Angeles, Calif., assignor to the Government of the United States of America as represented by the Secretary of the Navy Original application May 15, 1934, Serial No. 725,815. Divided and this application September 9, 1939, Serial No. 294,175

4 Claims. (Cl. 73—152)

This application is a division of my co-pending application Serial No. 725,815, filed May 15, 1934, for Airplane safety device.

My invention relates to aircraft and more particularly has reference to safety indicators therefor.

On account of the great difficulty with which the maximum loads acting on an airplane in flight are accurately predicted, it has been customary to incorporate high factors of safety in all airplane structures. This is always desirable, but the great value of additional payload in modern high speed transport airplanes makes it highly profitable to eliminate every useless pound of structural weight. This cannot be done without danger unless some safeguard is furnished the pilot and passengers. The purpose of this invention is to afford such a safeguard by indicating directly to the pilot the structural and aerodynamic limitations of any given airplane. It is, therefore, a valuable improvement for any type of airplane, as it is well known that it is practically impossible to build an airplane which cannot be broken in the air by violent maneuvers.

An important object of this invention is to facilitate the direct use of the results obtained from a stress analysis of the airplane structure and thereby bridge the wide gap which at present exists between the well-developed science of stress analysis and the very approximate methods of predicting the maximum loads likely to be imposed by the pilot.

Another important object of this invention is to furnish an indication of the approach or existence of a dangerous aerodynamic condition, commonly known as the stall.

A further object of my invention is to indicate the allowable values of positive or negative accelerations for any flight velocity.

Yet another object of this invention is to eliminate lag in the response of the indicator to a change in flight conditions.

Another object of my invention is to provide an adjustment for variations in the gross weight of the airplane.

Yet a further object of this invention is to eliminate moving parts and thereby to simplify the construction of the instrument, as well as to increase its sensitivity.

With these and other objects in view, which may be incident to my improvements, the invention consists in the parts and combination to be hereinafter set forth and claimed, with the understanding that the several necessary elements, comprising my invention, may be varied in construction, proportions, and arrangement, without departing from the spirit of the invention and the scope of the appended claims.

This invention comprehends an aircraft instrument in which the acceleration acting on the airplane in a direction substantially perpendicular to the lifting surfaces, and the dynamic pressure corresponding to the velocity of the airplane through the air, are combined in such a manner as to give an indication by means of a visual signal when any certain predetermined combinations of acceleration and dynamic pressure have been attained, particularly those combinations which represent dangerous structural loading or aerodynamic conditions.

In the drawing:

Figure 1 represents typical curves of allowable acceleration plotted against dynamic pressure for a specific airplane.

Figure 2 is a sectional view of a form of the invention.

Figure 3 is a sectional view taken on line A—A of Figure 2.

Figure 4 illustrates a form of the instrument employing a dial and pointers, parts being shown broken away and in section.

Figure 5 is a sectional view taken on line C—C of Figure 4.

Figures 6 and 7 show a front elevation and a sectional side view of an instrument in which light beams are used as indices.

It is known that curves of allowable acceleration against dynamic pressure could be derived for each main structural member of an airplane. In certain types of airplane structures, such as externally braced monoplanes or biplanes, brace struts are employed which have a relatively low ultimate strength as long columns in compression. In such cases these struts would fail at certain combinations of negative (downward) acceleration and dynamic pressure. A typical curve for such a member is illustrated in Figure 1 as curve B.

It is important to note that when allowable accelerations are plotted against dynamic pressure, the resulting curves are straight lines, or very nearly so. This is due to the fact that the wing moment about a certain point on the wing chord is linearly dependent on the dynamic pressure and practically unaffected by all other variables. The allowable acceleration curves for the front and rear spars are, therefore, shown as straight lines in Figure 1, the line F representing a front spar and the line R representing a rear spar. This straight line relationship becomes of great importance in making possible a desirable form of instrument, as will be shown later.

It can easily be shown that there exists also a linear relationship between the values of acceleration and dynamic pressure required to produce a given lift coefficient for the wing. Therefore, if the maximum lift coefficient (at the burble point) is used in the basic equation, a straight line curve will be obtained which represents the well-known "stall" condition. As practical example of this condition, if an airplane is required to make a sudden pull-out from a dive, it is important not to exceed the maximum lift coefficient, as the airflow over the wing would then break down and permit the airplane to "squash" and lose altitude or go into a spin. Obviously, if a dangerous structural load would be obtained before reaching the maximum lift coefficient, the latter would be of no importance, as the structural load curves would give the limiting acceleration. On the other hand, due to the breakdown of the airflow beyond the maximum lift coefficient, the theoretical structural load curves are meaningless beyond this point. Therefore, the "stall" curve can replace the structural load curves wherever the former shows lower values of acceleration.

The above points are illustrated in Figure 1, in which curves +S and −S are plotted for the positive and negative stall. Positive stall occurs where the angle of attack is increased positively until the lift instead of increasing, actually decreases while negative stall is the reverse of this condition, that is to say in negative stall positive angles of attack are replaced by negative angles of attack and positive lift is replaced by negative lift. In other words, negative stall refers to the position of the airplane when stalled in inverted flight. The allowable acceleration curves for front and rear spars are shown as F and R, while that for the lift strut is indicated by the letter B. It is desirable to limit the airflow to a certain indicated diving velocity, which is, of course, represented by a vertical line D at the corresponding value of dynamic pressure. The "safe" area is contained within the various curves, as indicated by the shading in Figure 1. The dotted line M—M represents the dynamic pressure at the minimum flying speed and therefore forms the practical minimum limit for dynamic pressure. It will be noted that the negative acceleration curves will act as positive limits in inverted flight.

The apparatus illustrated in Figure 2 shows how the negative acceleration curves can be incorporated in the invention. It will be noted that a pendular support 1, for the insulated contact plate 2, is employed. Obviously, the shape of the curves 3 cut out of the contact plate must conform to the paths of motion employed for the moving parts of the instrument. In Figure 2, the essential parts are more or less diagrammatically indicated, 4 being the pressure responsive device, 5 the accelerometer (flat spring type), 6 the contact point and 7 and 8 the connections for the dynamic and static pressure leads from the Pitot tube. The electrical terminal 9 is connected to insulated plate 2 and, externally, to the live side of a circuit which passes through a suitable signal and is then grounded as indicated. Members 10 and 10a are adjustable stops which complete the circuit when either the maximum or minimum flying speeds are reached.

Adjustment to compensate for a change in airplane gross weight is effected by moving weight 11 to the left for a decrease in gross weight.

Figure 3 is a cross-section through A—A of Figure 2, showing how the contact member or index 6 is arranged with respect to the contact plate 2.

It is obvious that the instrument illustrated in Figure 2 will perform in the same manner as that illustrated in my previous application and will, in addition, give indications of the approach or existence of positive or negative stall conditions as well as structurally dangerous negative accelerations. As in the instrument of the above mentioned application the case can be arranged with a glass cover for visual use, or located out of sight, preferably near center of gravity of the airplane, in which case the electrical signal system would be employed. In operation, the electrical circuit will be closed by contact of plate 2 with the index 6 or stops 10 or 10a, depending on the value of the dynamic pressure acting on the pressure responsive device 4. The closing of the electric circuit actuates a suitable electrically operated signal, thereby warning the pilot that a dangerous condition has been reached.

Figure 4 illustrates, by means of a partially sectioned plan view, how the original instrument can be modified to cause a pointer or pointers to indicate directly on a dial the values of allowable acceleration as a function of dynamic pressure. Accelerometers of the dial type, which indicate the actual acceleration at any instant, are already in use. Therefore, a dial type of instrument indicating the allowable accelerations is desirable for use either as a separate instrument, or, preferably, in combination with the known type of dial accelerometer.

As illustrated in Figure 4, 66 is the accelerometer of the segmental rack type as distinguished from the flat spring type shown in Figure 2, and it is provided with an arcuate toothed portion 67 that engages a pinion 68. The variation of the allowable acceleration is simply translated with a rotary motion of the pointer 12, by means of a roller 13, rack 14, and pinion 15, operating on the cam-shaped plate 16 that is mounted on a member 16', one end of said member being connected to a pressure responsive device 65, the opposite end of said member 16' engaging a support 16, which, it will be appreciated, is basically the same as the contact plate described in the previously referred to application. In order to indicate also the allowable values of negative acceleration, a second cam-shaped plate 17 is mounted on the member 16' and in operative engagement with a second similar system of members operating the pointer 18. The plate 17 will obviously have a contour determined by the shape of the negative acceleration curves as shown in Figure 1.

In using this form of instrument in combination with a direct-reading dial type of accelerometer, the same dial would be used and the instrument would contain the usual accelerometer mechanism in addition to that illustrated in Figure 4. The actual acceleration would be given by a third pointer 19, as shown in Figure 4.

Figure 5 shows a cross section through C—C of Figure 4, illustrating how two separate cam-shaped plates and separate racks and rollers are employed.

Figures 6 and 7 show, respectively, front and side elevations of an instrument which is the same in principle as that illustrated in Figure 4, except that the readings are obtained by means of light beams instead of pointers. Where great sensitivity and absence of lag are desired, the use of light beams as indices is common practice. The method of applying such usage to this invention is obvious from the drawing.

A mirror 20 is pivoted at 21 and is caused to rotate in accordance with a predetermined relationship between acceleration and dynamic pressure, the proper motion being obtained by means of the cam-shaped plate 22 and a suitable system of levers connected to the roller or cam-follower 23. A suitable source of light 24 causes a beam to be reflected from the mirror 20 to the translucent scale 21', thus indicating thereon, to a visible scale, the allowable value of acceleration. Another mirror 20a is similarly pivoted and is actuated by variations in the acceleration through a mechanism similar to that diagrammatically illustrated by the spring 23 and lever system 24a. This causes a second light beam from source 25 to play on scale 21 and indicate the value of the actual acceleration. The acceleration-indicating mechanism as shown is not basically new, having been previously used in recording accelerometers. The remaining features of the instrument are similar to those previously described and require no further explanation. A separate mirror and mechanism for negative accelerations would, of course, be required, but this has already been shown in principle in Figure 4.

From the foregoing description, it will be appreciated that I have provided a novel instrument for indicating the existence of any predetermined relationship between acceleration acting on the airplane and the dynamic pressure corresponding to the velocity of the airplane through the air. The importance of this invention as an aid to safe air transportation is at once apparent, as it can be used not only to warn the pilot against developing unsafe loads in the airplane structure but also to indicate the approach of dangerous attitudes of flight leading to loss of control. The question of the effect of variations in air density with altitude is automatically solved by this invention, as the dynamic pressure, being of a more basic nature than the airplane velocity, includes the combined effects of air density and velocity. Furthermore, both acceleration and dynamic pressure are easily measurable, the latter measurement being in fact already available on practically every airplane by simply connecting the instrument to the pressure lines from the Pitot tube to the airspeed indicator.

Recent developments in aeronautical research indicate the existence of a critical relationship between acceleration and dynamic pressure with respect to wing flutter. It is, therefore, probable that the range of usefulness of this invention will be extended to the prediction of and warning against the occurrence of wing flutter, a phenomenon which is particularly dangerous and which is likely to occur at high speeds on certain types of airplanes.

The use of the instrument as a simple, foolproof, stall indicator is obviously important, in itself, particularly since the true stall condition at any velocity can be anticipated. This feature is of great value in connection with airplanes which are to be dived to high speeds and then pulled out with a minimum loss of altitude. It should be particularly noted that this instrument does not confine itself to an indication of "stalling speed," as commonly understood.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

What I claim is:

1. A device for indicating during the flight of an airplane, the approach and the existence of any flight condition characterized by certain predetermined combinations of the variables of acceleration acting on the airplane in a direction substantially perpendicular to the lifting surface of the airplane and the dynamic pressure due to the velocity of the airplane through the air comprising indices having pointers, some of said indices comprising members shaped in accordance with the contour of curves obtained by plotting positive and negative accelerations against dynamic pressure for said combinations, means for moving one of said indices in proportion to the variable of acceleration, said means including an accelerometer, a device responsive to variations in dynamic pressure connected to said indice members, the relative motions of the indices being such that their relative positions indicate at any instant the relation between the actual value of one of said variables and the values of the same variable which would be required to produce one of said combinations at the existing value of the other variable.

2. A device for indicating during the flight of an airplane, the approach and the existence of any flight condition characterized by certain predetermined combinations of the variables of acceleration acting on the airplane in a direction substantially perpendicular to the lifting surface of the airplane and the dynamic pressure due to the velocity of the airplane through the air comprising pointers, said pointers adapted for movement over a dial, members shaped in accordance with the contour of curves obtained by plotting positive and negative accelerations against dynamic pressure for said combinations, means connecting some of said pointers to said members, a device responsive to variations in dynamic pressure connected to said members, one of said pointers moving over said dial and with respect to a zero position in response to the variations in the actual value of one of said variables, a second of said pointers movable along substantially the same path as the first named pointer, the position of the second pointer with respect to the zero position of the first pointer representing to the scale of motion of the first pointer the value of the first variable in conjunction with the existing value of the second variable which will produce one of said predetermined combinations, the relative position of said pointers indicating the relationship between the actual value of the first variable and that value of the first variable required to produce one of said predetermined combinations of acceleration and dynamic pressure.

3. An instrument as claimed in claim 2, said one pointer having connecting means for moving said pointer in proportion to the variable of acceleration, said means including an accelerometer, a third pointer being moved in response to the variations in the actual value of the second variable, said one and said third pointers indicating the relationship between the actual value of the first variable and the negative value of the first variable required to produce one of said predetermined combinations of acceleration and dynamic pressure.

4. A device for indicating during the flight of an airplane the approach and the existence of any flight condition characterized by certain predetermined combinations of the variables of acceleration acting on the airplane in a direction substantially perpendicular to the lifting surfaces of the airplane and the dynamic pressure due to the velocity of the airplane through the air comprising an index including a light beam and a translucent scale, a member shaped in accordance with the contour of curves obtained by plotting positive accelerations against dynamic pressure for said combination, means connecting said index to said member, a device responsive to variations in dynamic pressure connected to said member, said index moving said light beam over the translucent scale and with respect to a zero position in response to the variations in the actual value of one of said variables, another index including a light beam movable along substantially the same path as the first beam, said other index connected to means for moving said light beam in proportion to the variable of acceleration, said means including an accelerometer, the position of the first beam representing to the scale of motion of the first index the value of the first variable which in conjunction with the existing value of the second variable will produce one of said predetermined combinations, the relative position of said indices indicating the relationship between the actual value of the first variable and that value of the first variable required to produce one of said predetermined combinations of acceleration and dynamic pressure.

FRANCIS R. SHANLEY.